May 5, 1970     H. MIRTAIN     3,509,930

PNEUMATIC TIRES

Filed Feb. 12, 1968     2 Sheets-Sheet 1

INVENTOR.
HENRI MIRTAIN
BY Norbert P. Holler
ATTORNEY

May 5, 1970 H. MIRTAIN 3,509,930
PNEUMATIC TIRES
Filed Feb. 12, 1968 2 Sheets-Sheet 2
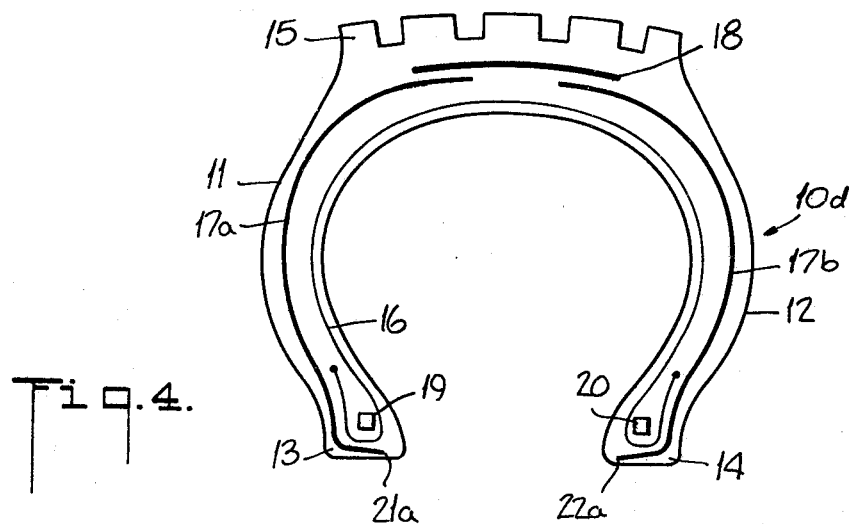
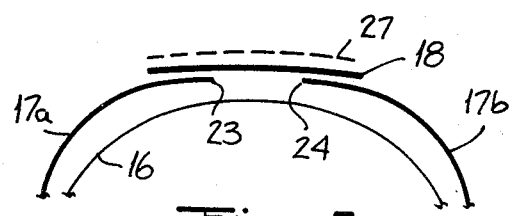
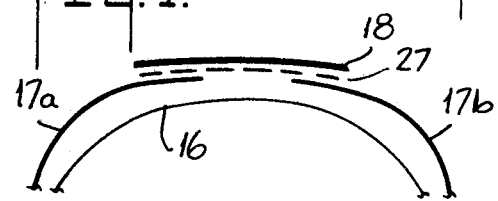 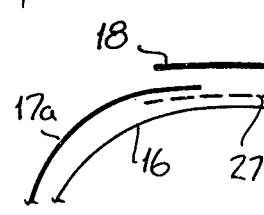
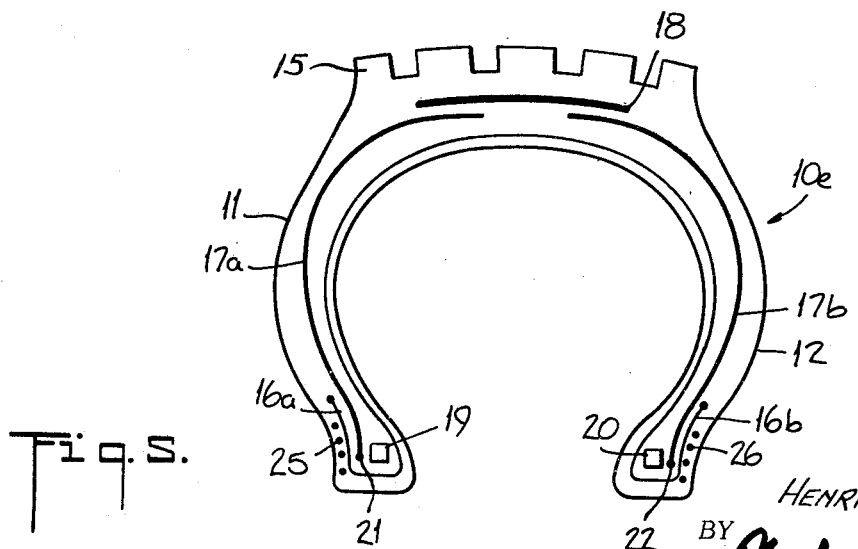
INVENTOR.
HENRI MIRTAIN
BY Norbert P. Holler
ATTORNEY United States Patent Office 3,509,930
Patented May 5, 1970

1

3,509,930
PNEUMATIC TIRES
Henri Mirtain, Compiegne, France, assignor to Uniroyal, Englebert France S.A., Paris, France, a corporation of France
Filed Feb. 12, 1968, Ser. No. 704,754
Claims priority, application France, Mar. 14, 1967, 98,745
Int. Cl. B60r 5/00, 9/00, 11/00
U.S. Cl. 152—354   10 Claims

ABSTRACT OF THE DISCLOSURE

A radial ply tire construction wherein the carcass comprises a continuous radial inner ply structure and an outer ply structure which is discontinuous in the crown region of the tire and the cords or cables of which have a lower coefficient of elongation than the cords of the inner ply structure. The sections of the outer ply structure terminate beneath the breaker structure at respective distances in from the opposite edges of the latter ranging from about ⅛ to not more than ½ the width of the breaker structure. The cords or cables in the sections of the outer ply structure are preferably also substantially radially oriented, but may be non-radially inclined at an angle ranging from about −45° to +45° to the radial direction in one of the sections of the outer ply structure.

---

The foregoing abstract is not to be taken either as a complete exposition or as a limitation of the present invention, and in order to understand the full nature and extent of the technical disclosure of this application, reference must be had to the following detailed description and the accompanying drawing as well as to the claims.

This invention relates to pneumatic tires for vehicles, and more particularly to the type of tires generally called radial or radial ply tires.

The expressions "radial tires" and "radial ply tires" as commonly used in the pneumatic tire art may be said to include various tire constructions having one or more body or carcass reinforcement plies of weftless cord fabric extending from bead to bead wherein the cords or cables in each ply are substantially radial in orientation. Specifically, in a monoply radial tire construction, the cords or cables normally have a high bias angle of 90°, i.e. in the unshaped carcass they are disposed perpendicular to the planes of the beads, and in the finished tire in meridian or radial planes of the same which are perpendicular to the equatorial or circumferential center plane of the tire. In a two-ply radial tire construction, the cords or cables in the two body plies are usually oriented at respective oppositely disposed small angles of up to 10° to the perpendicular to the equatorial plane, in which case the respective body plies are said to have oppositely disposed high bias angles of 80° or greater (but less than 90°). In four-ply or heavier radial tire constructions, similar opposed orientation of the cords in successive body plies is usually employed. All of these body or carcass constructions are contemplated within the scope and meaning of the expressions "radial" and "substantially radial" as used herein.

Radial tires also generally have a breaker or belt interposed between the crown region of the carcass and the tread for reinforcing the latter, such breaker being comprised of one or more plies of usually weftless cord fabric the cords or cables of which are made of generally inextensible materials, e.g. metallic wires, glass filaments, polyester filaments, etc. In a monoply breaker, the cords or cables have a relatively low bias angle of 0°, i.e. they

2 are oriented substantially parallel to the planes of the beads and the equatorial plane or crown centerline of the tire. If the breaker is a multi-ply structure, similar but opposed low bias orientations of the cords or cables generally at angles ranging up to about 25° or so with respect to the equatorial plane are employed in successive plies.

Although radial tires are possessed of a number of advantages which are by now well known to those skilled in the art, they have nevertheless been found to be subject to some drawbacks. One of these has been what may be termed as susceptibility of the sidewalls to undergo certain deformations which lead to the generation of stresses and strains that are detrimental to the good behavior of the casing and are a source of fatigue harmful to the longevity of the tire.

It is an object of the present invention, therefore, to provide a novel and improved radial ply tire construction.

More particularly, it is an object of the present invention to provide a radial ply tire construction the carcass of which is sufficiently rigid to limit the deformations of the tire and yet is sufficiently flexible to enable the tire to have a good shock resistance.

Generally speaking, a radial ply tire construction according to the present invention is essentially characterized by the fact that it includes at least two superposed cord fabric ply structures, the cords or cables of the inner one being substantially radially oriented and having a higher coefficient of elongation than the cords or cables of the outer ply structure which preferably are also substantially radially oriented. The inner ply structure is preferably turned up around the bead cores while the outer ply structure preferably extends down to the level of the beads and may be turned under the latter. Advantageously, the outer ply structure is discontinuous in the crown or tread region of the tire, the two sections of the outer ply structure terminating at predetermined distances in from the lateral edges of the breaker ranging from about ⅛ to ½ of the total width of the breaker. In accordance with a particular modification of the invention, the cords or cables in one of the sections of the outer ply structure may be non-radially inclined at an angle ranging from about +45° to −45° relative to the radial direction while the cords or cables in the other section are radially oriented.

The foregoing and other objects, characteristics and advantages of the present invention will be more clearly understood from the following detailed description thereof when read in conjunction with the accompanying drawings, in which:

FIGS. 4 and 5 are similar views showing other possible bead region modifications of the carcass construction within the confines of the present invention; and FIGS. 6, 7 and 8 are diagrammatic representations of other possible crown region modifications of the carcass construction within the confines of the present invention.

Figure 1:
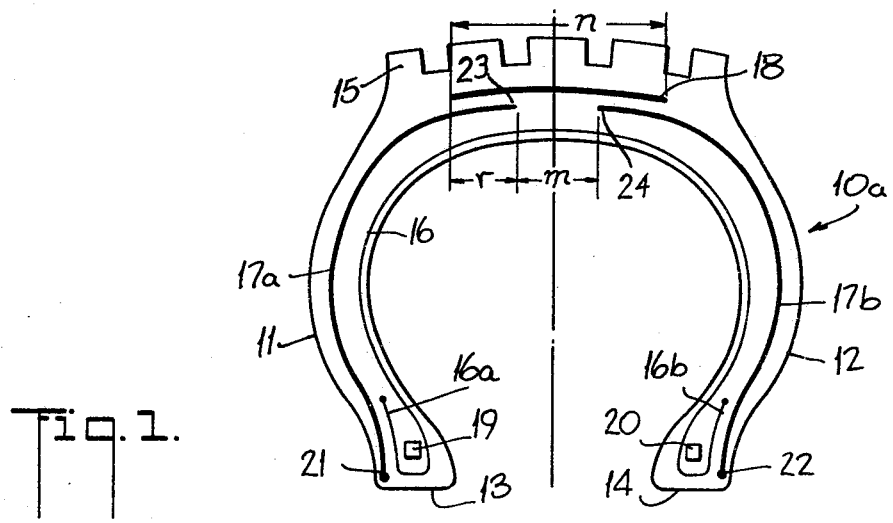
FIG. 1 is a diagrammatic, transverse section through a tire having a carcass construction according to one aspect of the present invention and also illustrates the basic dimensional parameters involved.

Referring now first to FIG. 1, the tire 10a there shown comprises sidewalls 11 and 12 terminating at their radially inwardmost ends in beads 13 and 14 and merging at their radially outwardmost ends into a tread 15 defining the road-contacting surface of the tire. In accordance with the present invention, the carcass or body of the tire comprises a continuous radial inner ply structure 16 and a two-section radial outer ply structure 17a–17b which is discontinuous, in a manner to be more fully explained presently, in the crown or tread region of the tire bneath the tread-reinforcing breaker structure 18. The opposite end regions of the inner ply structure 16 are preferably turned up around the bead wire bundles or cores 19 and 20 and, as shown at 16a and 16b, extend for a short distance outwardly through the sidewalls 11 and 12, while the remote edge or marginal regions of the outer ply structure 17a–17b extend past the turnups of the inner ply structure and preferably terminate at the beads 13 and 14, as shown at 21 and 22. It will be understood that either the inner or the outer ply structure or the breaker structure or all of them may be of either monoply or multi-ply construction.

For the purposes of the present invention it is essential that the cords or cables in the inner ply structure be possessed of a higher coefficient of elongation, i.e. that they be more stretchable, than the cords or cables of the outer ply. Accordingly, the inner ply structures may use cords or cables of any suitable natural or synthetic textile material such as nylon, rayon, polyester, glass fiber, etc., having an appropriate relatively high coefficient of elongation, while the outer ply structure may use cords or cables of any suitable natural or synthetic textile material or metal wires, e.g. steel, having an appropriate relatively low coefficient of elongation and preferably one which is much lower than that of the cord material in the inner ply structure.

As clearly shown in FIG. 1, the proximate marginal regions of the outer ply structure 17a–17b extend equal distances $r$ in under the opposite sides of the breaker structure 18 and terminate, as shown at 23 and 24, so as to leave a discontinuity of width $m$ between their adjacent edges which is less than the width $n$ of the breaker structure 18 but in no case less than zero. Preferably, the distance $r$ will range from about $n/8$ to at most $n/2$, the latter being the condition illustrated for the tire 10b in FIG. 2 where $m$ is substantially equal to zero, so that the ply sections 17a and 17b just about meet at the crown centerline or equatorial plane of the tire but nevertheless remain separated. In the other figures, the condition illustrated is where the distance $r$ is approximately equal to $n/4$.

Figure 2:
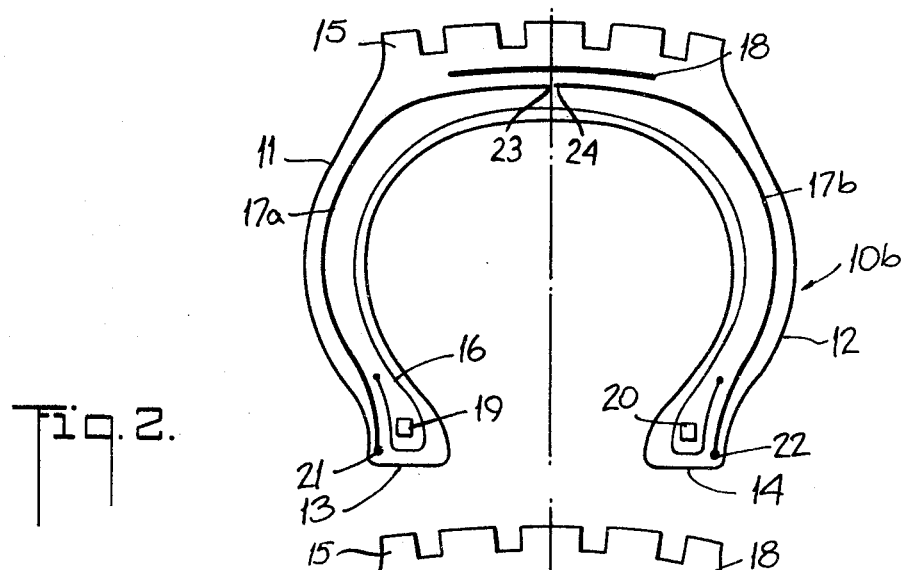
FIGS. 2 and 3 are similar views of such tires and illustrate, respectively, a variation in dimensional parameters and a variation in the cord orientation in the outer ply structure according to the present invention.
Figure 3:
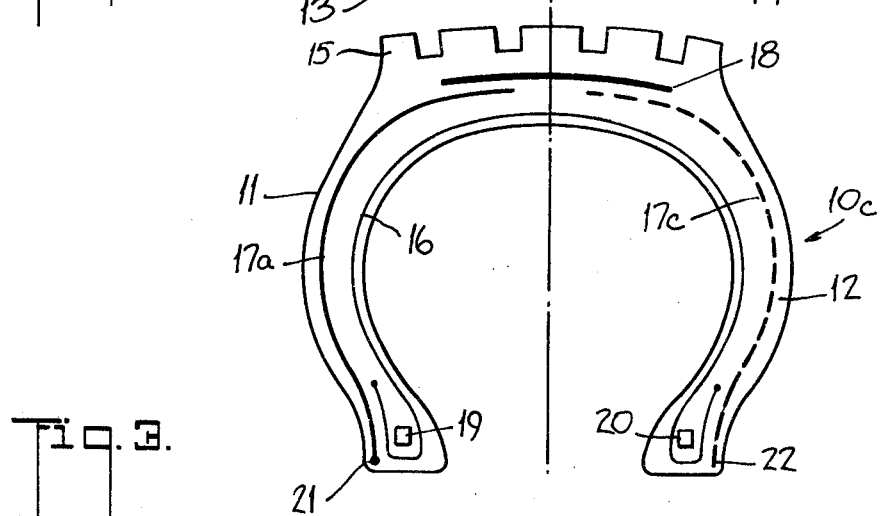

The principles of the present invention so far outlined may also be embodied in carcass constructions differing from those illustrated in FIGS. 1 and 2 in some structural aspects other than the relationships between the dimensions $m$, $n$ and $r$. Thus, as represented by the tire 10c shown in FIG. 3, only one section 17a of the outer ply structure may be of radial construction, while the other section, here designated 17c, may have its cords or cables oriented at a predetermined angle to the "radial" direction as that term has been defined herein, which angle may be as high as about 45° in either sense, i.e. it may range from about +10 to +45° and from about −10 to −45° with respect to the radial direction; as represented by the tire 10d shown in FIG. 4, the remote edge regions of the outer ply structure sections 17a and 17b (or 17c) may also be turned under the bead cores 19 and 20 so as to terminate at 21a and 22a; and, as represented by the tire 10e shown in FIG. 5, the remote ends 16a and 16b of the inner ply structure 16 may be turned up to the outside of the bead region margins 21 and 22 of the inner ply structure 17a–17b (or 17a–17c), while in addition thereto respective bead reinforcing plies or rim cushions 25 and 26 made of cords or cables or shorter fibers of natural or synthetic textile material or metal may be provided to protect the turnups 16a and 16b. It will be apparent that the use of a non-radial ply section 17c in the outer ply structure will lead to a type of asymmetric tire construction which may be found advantageous in certain conditions or for special purposes.

By the same token, the principles of the present invention may be embodied in tire constructions differing from those illustrated in FIGS. 1 to 5 by virtue of including yet another structural features such as bead cores reinforced by bead wrap (not shown), extra tread or carcass reinforcements, etc. Merely by way of example, as diagrammatically represented by FIGS. 6 to 8, the breaker structure 18 may be supplemented by an additional belt or breaker-like ply structure 27, extending across the discontinuity or gap between the adjacent edges 23 and 24 of the outer ply structure 17a–17b (or 17a–17c) and having its cords or cables disposed at an angular orientation differing from the angular orientation of the cords or cables in the crown region of the carcass, for the purpose of reinforcing the carcass in the region of the discontinuity. This additional belt or ply structure may be placed around the primary breaker structure 18, as shown in FIG. 6, or between the primary breaker structure and the discontinuous outer ply structure 17a–17b (or 17a–17c), as shown in FIG. 7, or between the outer ply structure and the crown region of the inner ply structure 16, as shown in FIG. 8, in each case extending laterally outwardly beyond the proximate marginal regions of the sections of the outer ply structure.

Irrespective of the specific combination of structural details and features incorporated in a tire carcass constructed in accordance with the present invention, a cured tire reinforced thereby will be possessed of highly advantageous characteristics. Thus, in the case of a tire utilizing cords or cables of nylon in the inner ply structure and steel wires in the outer ply structure, the casing will exhibit a uniform geometric configuration by virtue of the low coefficient of elongation of the steel, and at the same time the carcass will have a good shock resistance by virtue of the presence of the nylon cords. Another advantage accruing from the present invention is that the manufacture of such tires as are herein contemplated will not require the use of special materials, such as centripetal segments in the tire molds, because the elongation properties of the stretchable inner ply structure cord material, e.g. nylon, are sufficient to permit the extension of the carcass in an ordinary mold, which extension is also not impeded by the low elongation material in the outer ply structure due to the discontinuity in the latter.

Although carcasses constructed in accordance with the present invention find their primary applicability in heavy service tires, it is contemplated that the principles disclosed herein may be embodied in any size tire.

It is to be understood, therefore, that the foregoing description of preferred embodiments of the present invention is for purposes of illustration only, and that the various constructions and the structural features and relationships herein disclosed may be modified in a number of ways none of which entails a departure from the spirit and scope of the present invention as defined in the hereto appended claims.

Having thus described my invention, what I claim and desire to secure by Letters Patent is:

1. In a radial ply tire having a carcass, sidewalls overlying the lateral portions of said carcass and terminating in respective beads at their radially inwardmost ends, a tread surrounding the crown region of said carcass, and a breaker structure interposed between said carcass and said tread; said carcass comprising an inner ply structure which is continuous from bead to bead and a two-section outer ply structure which is discontinuous in the crown region of said carcass, the cords in at least one section of said outer ply structure being substantially radially oriented, the cords in said inner ply structure being substantially radially oriented and having a higher coefficient of elongation than the cords in said outer ply structure, and each of said sections of said outer ply structure extending from the region of its associated bead toward the crown region of said carcass and terminating under said breaker structure at a distance in from the respective lateral edge of the latter which is equal to between about ⅛ and not more than ½ of the total width of said breaker structure.

2. In a radial ply tire according to claim 1; the cords in both of said sections of said outer ply structure being substantially radially oriented.

3. In a radial ply tire according to claim 1; the cords in the other of said sections of said outer ply structure being non-radially oriented at an angle between about +45° and about −45° to the radial direction.

4. In a radial ply tire according to claim 1; the cords in said ply structures being made of respectively appropriate materials selected from the group consisting of natural and synthetic textile fibers and metal.

5. In a radial ply tire according to claim 1; the cords in said inner ply structure being made of nylon, and the cords in said outer ply structure being made of steel.

6. In a radial ply tire according to claim 1; an additional reinforcing ply overlying the crown region of said carcass and extending across the discontinuity between, and laterally outwardly beyond, the proximate marginal regions of said sections of said outer ply structure.

7. In a radial ply tire according to claim 6; the cords in the other of said sections of said outer ply structure being non-radially oriented at an angle between about +45° and about −45° to the radial direction.

8. In a radial ply tire according to claim 6; said additional reinforcing ply being located in surrounding relation to said breaker structure.

9. In a radial ply tire according to claim 6; said additional reinforcing ply being located between said outer ply structure and said breaker structure.

10. In a radial ply tire according to claim 6; said additional reinforcing ply being located between said inner and outer ply structures.

References Cited

UNITED STATES PATENTS

| | | | |
|---|---|---|---|
| 2,493,614 | 1/1950 | Bourdon | 152—356 |
| 3,058,509 | 10/1962 | Maiocchi | 152—356 |
| 3,062,258 | 11/1962 | Maiocchi | 152—356 |
| 3,363,660 | 1/1968 | Mirtain et al. | 152—356 XR |
| 3,442,315 | 5/1969 | Mirtain | 152—354 |

RAPHAEL H. SCHWARTZ, Primary Examiner